(12) United States Patent
Clift

(10) Patent No.: US 9,487,933 B2
(45) Date of Patent: Nov. 8, 2016

(54) CUTTING BLADE APPARATUS AND METHODS

(76) Inventor: Dennis Wayne Clift, Gepps Cross Adelaide (AU)

( * ) Notice: Subject to any disclaimer, the term of this patent is extended or adjusted under 35 U.S.C. 154(b) by 0 days.

(21) Appl. No.: 14/386,768

(22) PCT Filed: Mar. 22, 2012

(86) PCT No.: PCT/IB2012/000826
§ 371 (c)(1),
(2), (4) Date: Sep. 19, 2014

(87) PCT Pub. No.: WO2013/140198
PCT Pub. Date: Sep. 26, 2013

(65) Prior Publication Data
US 2015/0020418 A1   Jan. 22, 2015

(51) Int. Cl.
| | | |
|---|---|---|
| *B28D 1/04* | (2006.01) | |
| *E02F 5/08* | (2006.01) | |
| *E02F 9/28* | (2006.01) | |
| *B23D 61/04* | (2006.01) | |
| *B28D 1/12* | (2006.01) | |
| *B28D 1/18* | (2006.01) | |
| *E21C 25/18* | (2006.01) | |
| *E02F 3/24* | (2006.01) | |
| *B23D 65/00* | (2006.01) | |
| *B28D 1/22* | (2006.01) | |

(52) U.S. Cl.
CPC ............. *E02F 9/2866* (2013.01); *B23D 61/04* (2013.01); *B23D 65/00* (2013.01); *B28D 1/04* (2013.01); *B28D 1/045* (2013.01); *B28D 1/121* (2013.01); *B28D 1/186* (2013.01); *B28D 1/22* (2013.01); *E02F 3/241* (2013.01); *E02F 5/08* (2013.01); *E21C 25/18* (2013.01)

(58) Field of Classification Search
CPC ................................... B28B 1/04; E02F 5/08
USPC .............................................. 125/15; 37/347
See application file for complete search history.

(56) References Cited

U.S. PATENT DOCUMENTS

| | | | | |
|---|---|---|---|---|
| 3,419,976 A | * | 1/1969 | Reising | B23D 61/06 125/15 |
| 3,498,283 A | * | 3/1970 | Cook | B24D 5/06 125/15 |
| 5,647,419 A | * | 7/1997 | Stewart | B27G 13/10 144/117.1 |
| 5,829,423 A | * | 11/1998 | Benz | B28D 1/122 125/13.01 |
| 6,712,062 B2 | * | 3/2004 | Wildenburg | B24D 5/123 125/12 |
| 2006/0288993 A1 | * | 12/2006 | Baratta | B23D 61/026 125/13.01 |

* cited by examiner

*Primary Examiner* — John G Weiss
(74) *Attorney, Agent, or Firm* — J. Mark Holland + Associates; J. Mark Holland; Alison L. Adnan

(57) ABSTRACT

A cutting blade includes a blade body 10 with one or more cutting elements 20/50 positioned along its periphery. The elements can be keyed to the blade core to help provide secure mounting onto the blade, and can include a polycrystalline diamond composite (PDC) portion as a primary cutting material. Protection elements 80 can be positioned to reduce wear and other damage to the blade core 10 and/or any substrate supporting the PDC, and thereby extend the life of the blade assembly.

5 Claims, 24 Drawing Sheets

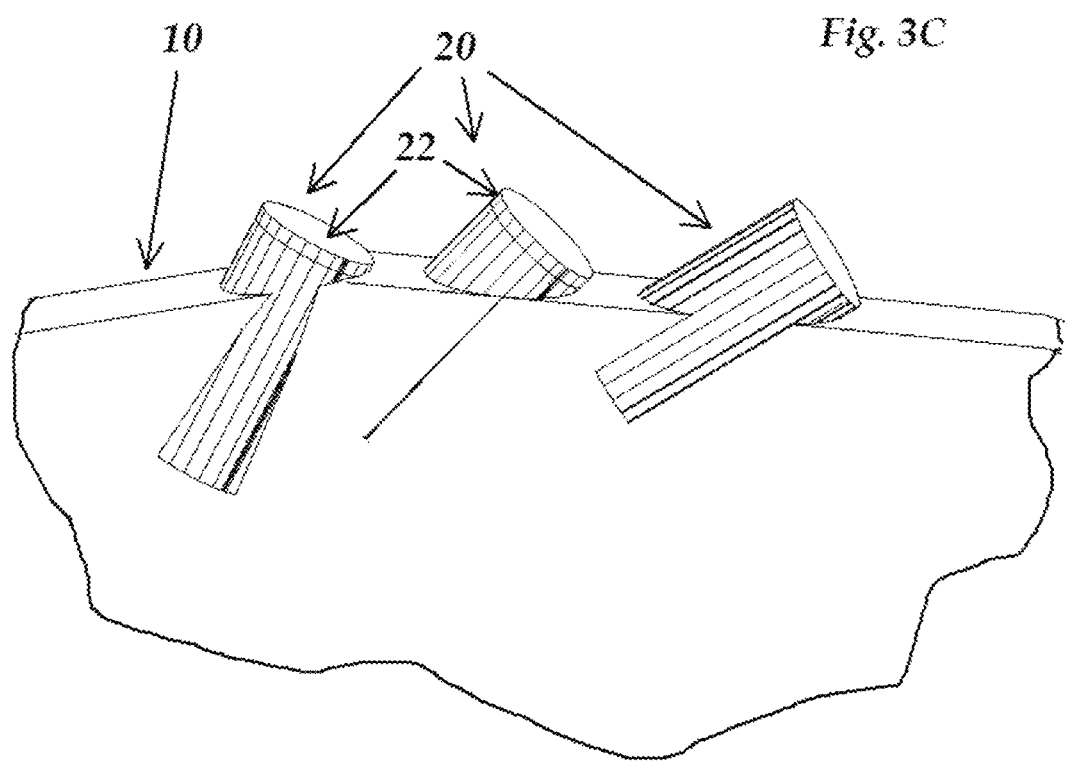

CUTTING BLADE APPARATUS AND METHODS

The present invention is described herein with reference to the accompanying Figures, which illustrate some of the many embodiments in and by which the invention may be practiced. Generally in those Figures and references, similar and/or identical reference numerals refer to similar and/or identical elements throughout this description. However, persons of ordinary skill in the arts relevant to the inventions will understand that any such similar reference numerals also are subject to the context of the description and other factors.

Those Figures and references, and the other terminology used in these descriptions, are intended to be interpreted in their broadest sense permissible by law. They are not intended to be interpreted in any unduly limited or restrictive manner, simply because they are used in conjunction with a description of one or more exemplary embodiments of the invention.

Persons of ordinary skill in the art also will understand that (a) the inventions described herein and covered by the claims may have one or more desirable attributes that may be related to a specific feature and/or combination of features (depending on the particular embodiment of the invention, and regardless of whether such embodiment is specifically described herein), and (b) the range of embodiments of the inventions covered by the claims is intended to be the broadest permitted by law, and may therefore include a wide range of permutations and combinations of such attributes and/or features, as well as including as few as one of such attributes and/or features.

DESCRIPTION OF DRAWINGS

FIGS. 3A-3C are enlarged views of the embodiment shown in FIG. 3.

DETAILED DESCRIPTION OF EMBODIMENTS

Figure 1:
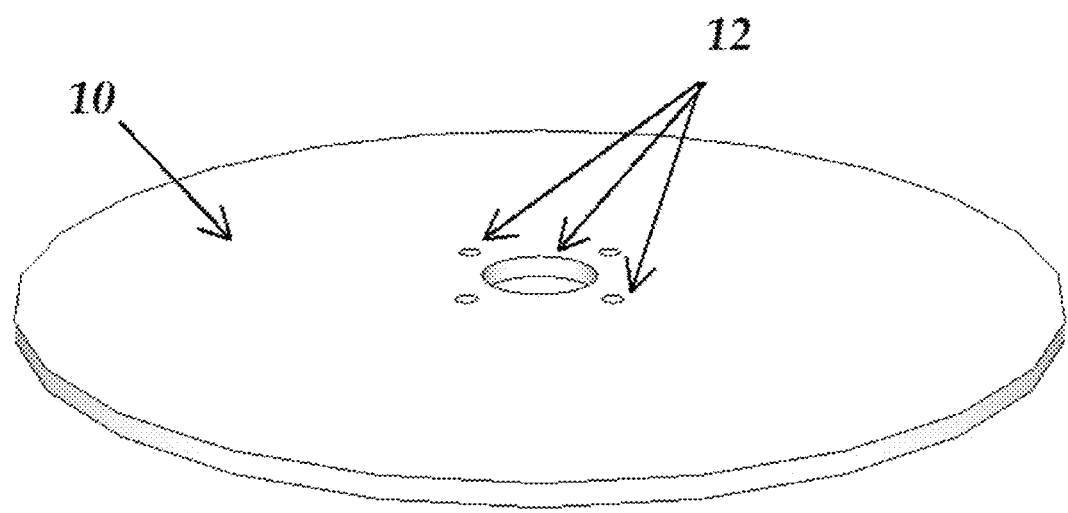
FIG. 1 is an elevation view of a preferred embodiment of the present invention.

The present inventions preferably include and/or constitute a saw blade and related methods of using embodiments of that blade. Although persons of ordinary skill in the art will understand that the present invention has many other uses, it is described herein primarily in connection with micro-trenching, and is especially useful for "dry-cut" micro-trenching roadways. The blade preferably cuts a relatively narrow trench with relatively clean edges (as compared to prior art micro-trenching technologies), and provides related benefits in increased speed, reduced costs, minimizing interference with traffic and traffic flow, and generally reducing the materials and labor required for such jobs.

As discussed herein, "micro-trenching" refers to a technique used to install fiber-optic cable and other small utilities under existing streets. According to an article published in 2009 (at http://www.bbpmag.com/2009issues/sep09/BBP_Sep09_Quanta.pdf):

"The latest development to stir up a buzz in fiber network deployments is micro-trenching. While narrow trenching is nothing new to the marketplace, micro-trenching, an emerging technology, allows trenches to be cut less than an inch wide and no more than 12 inches deep. The result is a faster, more efficient, cheaper way to install fiber.

"Broadband service providers, whether they are large telcos, cable companies or government entities, benefit from this quick-moving deployment methodology. Permitting authorities are also drawn to micro-trenching because sub-inch trenches are cut in existing rights-of-way and above existing utilities, thus avoiding utility service interruption and minimizing city street disruption. Streamlined permitting enables fiber deployments to be completed more quickly, increasing the likelihood for meeting tight time constraints.

"When micro-trenching entered the market, however, not everyone was convinced that it was a magic fix. Some deployers were worried shallow trenches wouldn't protect fiber networks from water damage or compression from traffic. Others feared the networks would be difficult to manage and prone to vandalism. Although these concerns have proved unjustified, micro-trenching is not a perfect science—yet.

"Micro-trenching started to evolve when Dan Miller, vice president of telecom operations for Quanta Services, began incorporating micro-trenching applications into the company's telecom service offerings. 'I became convinced that, with the right partners to collaborate on this initiative, we could create a more effective, more efficient and more economical way to micro-trench,' says Miller. He envisioned a process in which a single machine could cleanly cut and vacuum the sub-inch-wide trench in one pass, reducing the number of workers—and thus the budget—needed for a job."

Google is so in interested in the potential benefits of micro-trenching that they held a micro-trench "race" on Google's campus in 2010, in which the competing teams raced to cut a straight, thin trench, 9 inches deep, across a Google parking lot. Video of that contest is viewable on the Internet, including at http://www.youtube.com/watch?v=hXMe6WGa84I. In the audio portion of that video, Google discusses its goal of improving the technology so that fiber can be deployed more efficiently and faster and with less disruption to residents/traffic/etc. For that 2010 contest, Google's criteria included not only speed (how quickly the trench was cut), but also straightness of the cut, the depth and width of the cut, and the "spoil" that the contestants created by their trenching. Because a larger amount of "spoil" or "mess" can mean more disruption of the installation location and has a greater environmental impact, contestants scored higher by making less mess. Based on tests to date, embodiments of the present invention provide significant benefits in all of those Google-contest criteria.

Preferably, embodiments of the inventions use polycrystalline diamond composite (PDC) as a primary cutting material, although persons of ordinary skill in the art will understand that other cutting layer/surface/element/materials can be used instead of PDC, and still enjoy benefits of the inventions. Generally, the PDC or other cutting material is positioned on the blade core 10 at or near the contact/cutting interface (such as at the perimeter of a circular blade). As presently understood, the correct acronym for this material is "PDC," although certain people may refer to this same material as "PCD."

Prior to the present invention, PDC has been used on cutters in large and relatively complex drag bits for drilling bore holes in earth formations (such as for oil well drilling, petroleum/geology exploring, coalmining, and similar industries). PDC is a super hard material used on down-hole hammer bits, roller bits, bore-bits, and large-diameter hob drill bits. However, the present invention is believed to be the first time anyone has thought to use PDC on or in connection with a saw blade, and particularly in connection with micro-trenching. Instead, despite all of the high-profile efforts that have been made to improve the micro-trenching process (e.g., the "Google race" mentioned above), it appears that prior art micro-trenching has utilized only conventional diamond blades or tungsten carbide blades.

An example of PDC's prior art use on cutters for drilling bore holes is disclosed in U.S. Pat. No. 5,667,028 to Truax et al., which includes the following comments:

"PDC cutters are well known in the art [of making drag bits for drilling bore holes in earth formations] . . . . Generally, PDC cutters have a cylindrical shape. The cutting surface of a PDC cutter is formed by sintering polycrystalline diamond to the PDC cutter face."

These conventional prior art PDC cylinders for drilling bits to bore holes are sometimes manufactured from synthetic diamond grit sintered together by way of extremely high temperature and pressure to create a PDC layer. That PDC layer typically is bonded to one end of a cylindrically-shaped tungsten carbide substrate. Although much of the discussion herein uses those cylinders in examples of various embodiments of the invention, persons of ordinary skill in the art will understand that the specific shape and other characteristics of a PDC cutter or other cutting element of the invention can be selected from any of a broad range of suitable choices, and still be useful within certain embodiments of the present inventions.

Factors in those PDC design selections and decisions may include things such as material selection, adjusting the fabrication processes, shapes, substrate(s), the particular quality of the PDC, and others. For example, PDC generally possesses an extremely high hardness and abrasion resistance, while the substrate (such as tungsten carbide or other material) can be selected to improve the malleability and weld-ability of the whole composite assembly (PDC on substrate). Some of the many other embodiments include bonding the PDC directly to the blade, rather than to a substrate.

As mentioned above, the PDC or other cutting element in many embodiments will be positioned at or on the edge of the blade 10. However, persons of ordinary skill in the art will understand that PDC can also be positioned and disposed on the sides of the blade or in any other useful position and/or combination of positions, to provide a desired cutting/trenching performance. Likewise, other characteristics of the PDC (including, for example, the thickness and grade/quality of the PDC) may be selected and used for a given embodiment of the inventions, depending on the particular application for which the invention is to be used.

PDC is a relatively expensive material, and as with virtually any product, price and availability may be factors in making the selection of the PDC element and its design for any particular embodiment of the invention. Because so many cylindrical pieces of PDC are manufactured for the mining industry (as mentioned above), it is convenient and relatively cost-effective for at least certain embodiments of the invention to use the commonly-available cylindrical drilling/bore bits cutters, such as those mentioned in U.S. Pat. No. 5,667,028 to Truax. Like most products, the per-piece costs of fabricating a specific embodiment/shape of a PDC cutting element typically will decrease as the volume/number of pieces made/used increases. Thus, persons of ordinary skill in the art will understand that in designing any particular embodiment of the present invention (including designing the PDC/other cutting surface/element), price typically will have to be considered along with other factors (such as potential improvements in performance, lifespan, safety, and/or other trade-offs).

The contestants in the aforementioned Google contest all used large circular blades (several feet in diameter) to cut their micro-trenches. Although much of the description herein also relates to such embodiments, persons of ordinary skill in the art will understand that the invention can be useful in other configurations as well, and the particular application for which the inventions are expected to be used may affect the selection of a specific configuration. Among the many examples of other (non-disc/non-circular) embodiments for a blade "core" or mounting structure are oval and/or star/sun-shaped rotating disc elements, as well as on chain-type blades (such as are used in chain saws and/or other trenchers).

In embodiment such as illustrated in FIG. 1, the invention includes a central blade core 10 generally in the shape of a disc, with suitable mounting holes 12 or other means for operatively affixing the blade 10 to a saw motor or similar device (not shown) for powering/rotating the disc 10. Like virtually all of the elements and aspects of the embodiments discussed herein, the disc can be selected from a large variety of dimensions (such as diameter and thickness), materials (with varying weight, strength, and other performance characteristics), and other features. In certain embodiments for applications similar to those shown in the above-referenced Google video, the disc can be in the range of ½ inch to ¾ inches thick, and have a diameter of three feet or more (to enable cutting trenches in the range of 9 inches deep). Persons of ordinary skill in the art will understand that these dimensions are merely representative of the range of usefulness of the present inventions, and that specific embodiments of the inventions for different applications may use cores that vary substantially from those dimensions.

Figure 2:
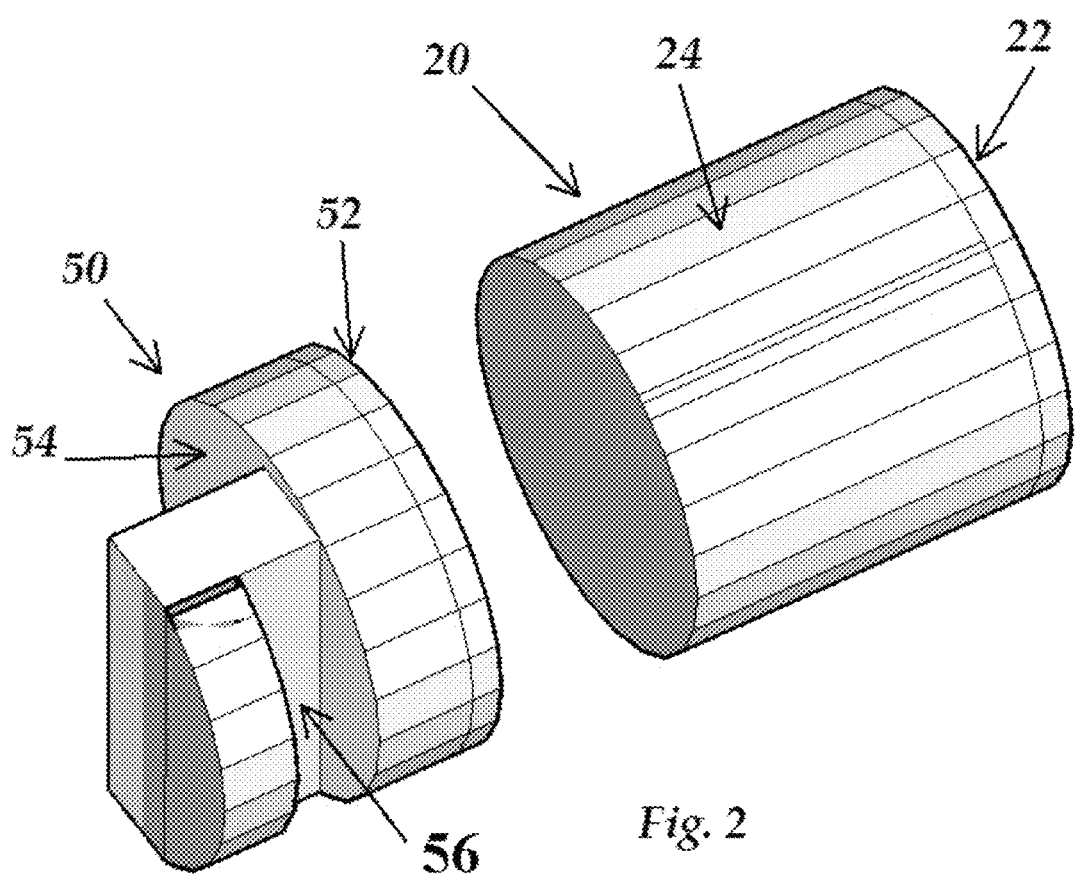
FIGS. 2 and 2A are elevation views of an exemplary keyed shape cutting element.
Figure 3:
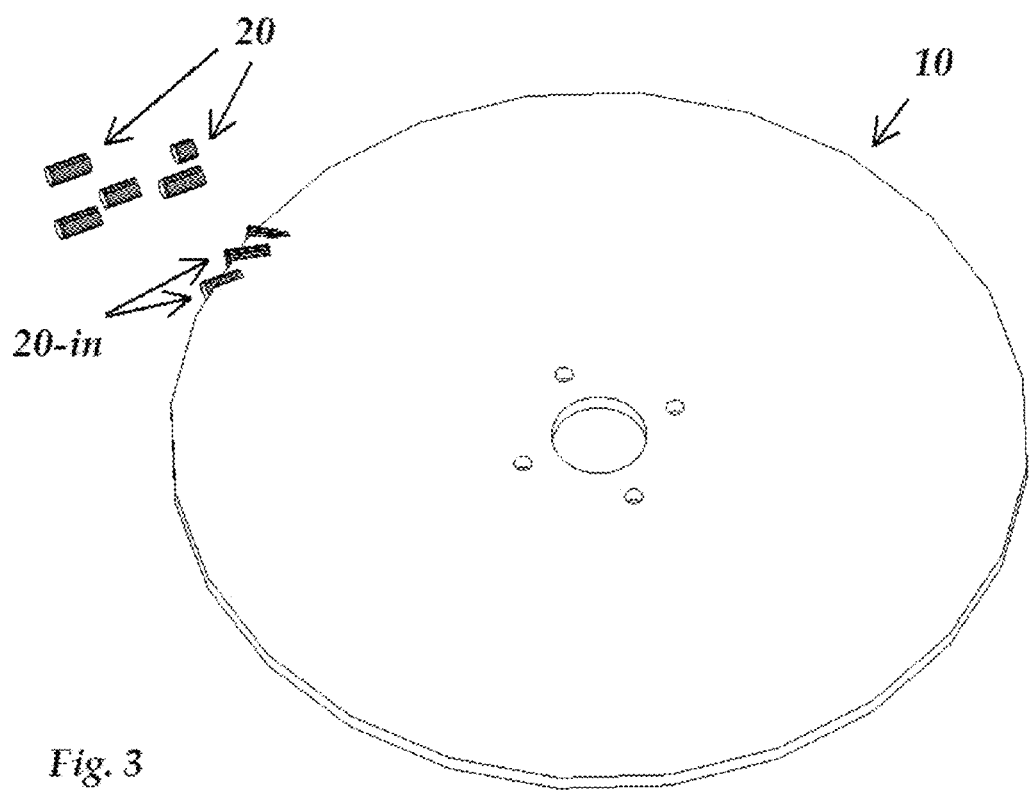
FIG. 3 is an elevation view of a blade assembly of the present invention having cutting elements affixed to a blade core.
Figure 3A:
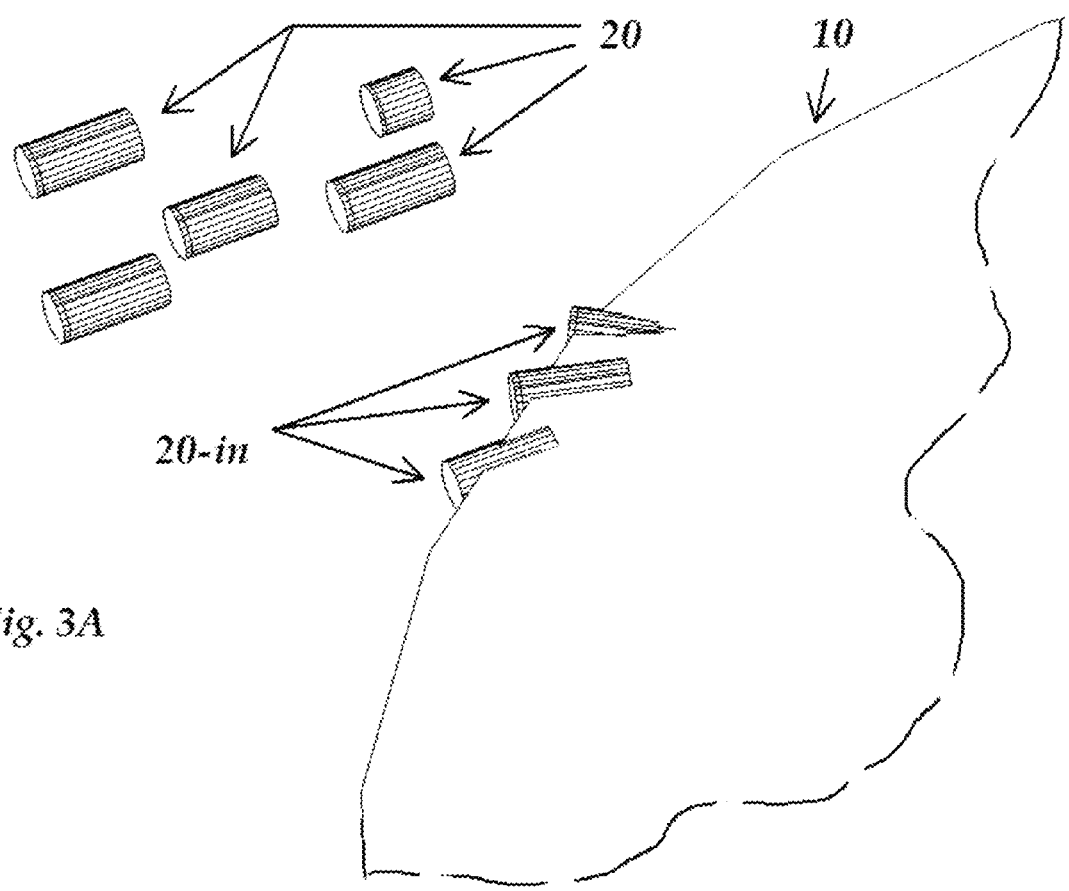
Figure 3B:
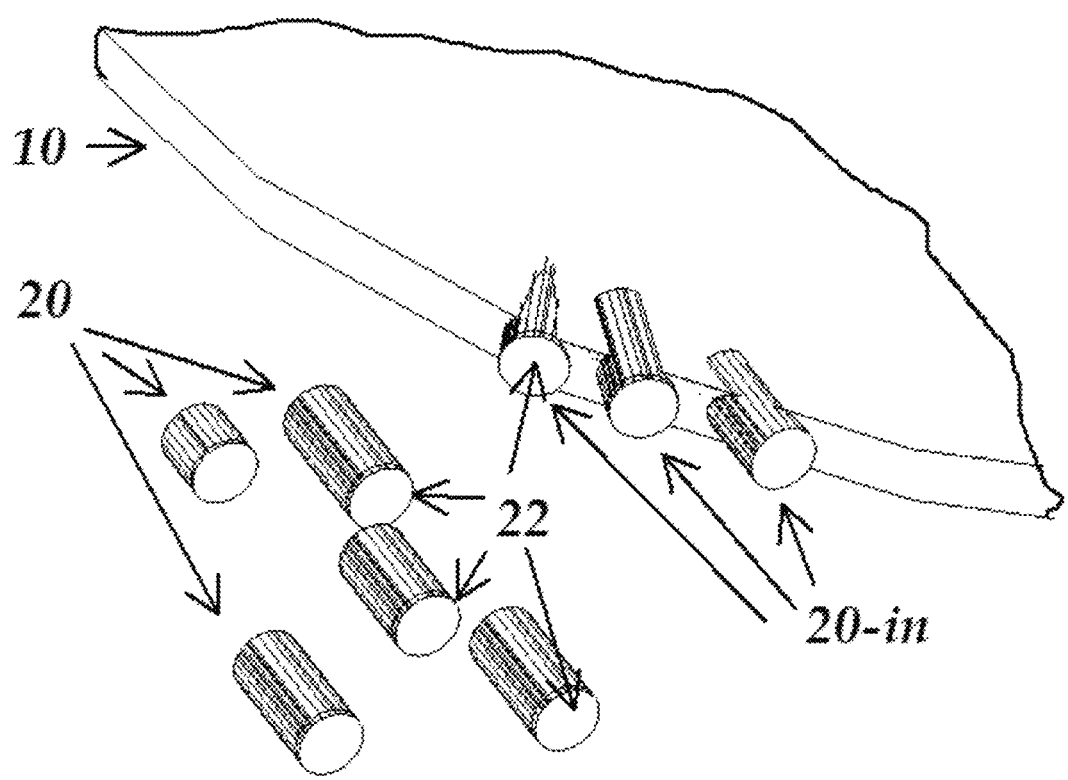

In many embodiments of the invention, the PDC or other cutting element preferably is affixed to the blade core 10 at a suitable position so as to be the main "cutting" element contacting the surface/material being cut or trenched. As indicated above, positioning the PDC or other cutting material at a desirable location can be accomplished in a wide range of suitable manners. Certain embodiments of the inventions may use a relatively simple mounting of a plurality of the PDC drill bit cutter elements at the perimeter of the blade core 10. As shown in FIGS. 1-3, a core 10 can be drilled at its perimeter with a series of openings corresponding to a plurality of cutting elements 20. The holes (or slots, in other embodiments) preferably are drilled or provided in a generally radial direction (toward the core's center), but each can be canted at a desired angle (uniformly about the perimeter, or varying). In addition to being angled with respect to the radius of the disc 10, the cutting elements 20 can be angled out of the plane of the disc (for example, in FIG. 3A, the uppermost of the three "20-in" cylinders (the ones that are shown as inserted/affixed to the disc 10) is canted not only with respect to the radius of the disc 10, but the exposed PDC-layer end 22 is tipped slightly upwardly out of the disc's plane. Persons of ordinary skill in the art will understand that this adjustment of the cylinders enables a customized cutting pattern for any given embodiment of the invention. Likewise, the depth of the opening/hole/slot for each cutting element 20 can be adjusted to affect the amount of PDC layer 22 that is exposed beyond the perimeter of the core 10. The cylinders 20 can be fixed into the slots/holes by silver-welding, brazing, and/or other suitable process or means, in a butt-joint or other relationship.

On a related point, persons of ordinary skill in the art will understand that the embodiments illustrated in FIGS. 1-3 show the cylinders 20 having a diameter that is greater than the thickness of the blade core 10. Among other things, this helps ensure that the cutting surfaces 22 cut a trench that is wider than the blade core 10's thickness. Among other things, this helps reduce the friction between the sides of the blade core 10 that are inserted into and are rotating within the trench as it is being cut. Other embodiments (not shown) can use cutting elements 20 that have a diameter smaller than the blade core thickness (in which case a trench wider than the blade can be cut by other means, such as by alternatingly angling the thinner elements 20 toward opposites sides of the blade 10.

The shape, size, and depth of the openings into which the cylinders are inserted preferably provide at least a snug fit for the inserted cylinders 20 (to provide support for the cutting elements during the blade's use), but as indicated above, the openings instead can be slots (not shown) or other shapes. Also, although the drawings only show three such "20-in" cylinders, persons of ordinary skill in the art will understand that many embodiments will have cylinders around the entire core perimeter. For these or other cutting elements (such as those discussed below), the elements can be spaced uniformly along the cutting edge/perimeter of the blade core 10, or at other spacing that is selected for the expected application/use of the blade.

Persons of ordinary skill in the art also will understand that the sides of the cutting elements 20 can be smooth and round (e.g., the cylinder shape 20), but in other embodiments can be shaped differently (e.g., with one or more straight sections, with a slight concave or convex or U-shaped curve, or multiple curves or other patterns).

Among other things, such shaping may improve the strength, cutting speed, longevity, and/or other characteristics of the PDC element and/or the entire blade assembly. Customization of the components and the blade assemblies of the inventions can help the blade cut straighter and/or to be less likely to chip or break, and may even be necessary for specific embodiments of the invention (e.g., for thinner blade cores, that among other things may be used to cut relatively thinner trenches/slots). Persons of ordinary skill in the art will understand that, among the many alternative embodiments of the invention, a plurality of differently sized/shaped/oriented/etc. cutting elements may be used on a single blade core, to provide potential benefits in cutting speed or otherwise.

As indicated above, some applications (such as many micro-trenching activities) generate such high heat on the blade 10 (from the friction/cutting action of the blade assembly cutting the trench) that simply placing and fixing the cylinders into slots or holes may not be sufficient to provide a safe and desirable performance. Among other things, the friction and/or heat may damage or weaken the bond between the blade core 10 and the cutting elements 20. Independently and/or additionally, the rotation speed and resulting centrifugal force may be so great that the cylinders 20 may be thrown out of their engagement with the blade core 10, potentially endangering people or things in the vicinity, in addition to possibly requiring the trenching operation to be stopped for repair. Accordingly, some embodiments of the inventions provide an additionally firm and/or secure engagement of the cutting elements 20 with the blade core 10.

Figure 2A:
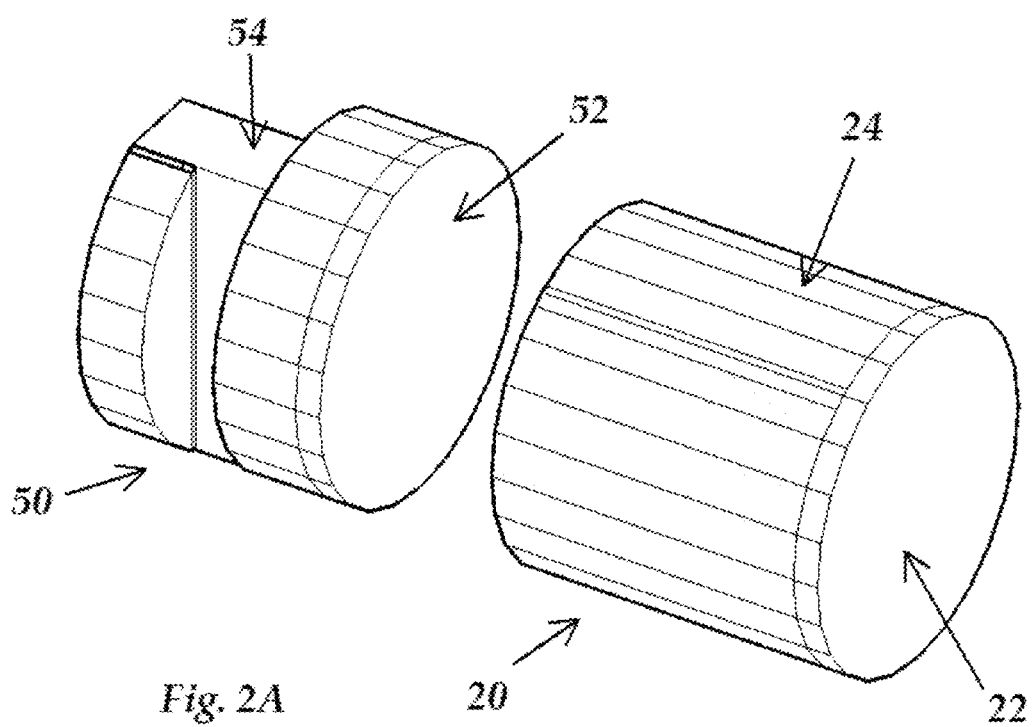

One such example is by "keying" the cutting elements to fit correspondingly-shaped openings formed or cut in the blade core 10. Persons of ordinary skill in the art will understand that the particular shape of the keyed relationship can be any of a wide variety, and that other methods besides keying can be used to further secure the cutting elements to the blade. For keyed securement embodiments of the invention, the PDC or other cutting element can be custom fabricated, or the commercially-available drill bit cutter cylindrical shapes 20 can be modified to the keyed configuration (for example, see the discussion below regarding FIGS. 2 and 2A and the exemplary keyed shape of element 50 in those drawings). In either approach, the keyed cutter 50 is shaped from the standard cylinder 20 to match (or at least generally engage the "key" in) the opening in the core, and is then placed into that opening and then welded or otherwise secured in place. Preferably, the keying securement relationship provides an additional interference fit to help "lock" or hold the cutting element 20 into its relationship with the blade core 10, even under the extreme conditions and stresses to which it may be exposed during use.

Persons of ordinary skill in the art also will understand that, although many of the drawings illustrate using (or starting from) a generally cylindrical cutting element 20, the shape and other characteristics of the PDC or other cutting element/surface 22 (as well as any supporting substrate 24) in any particular embodiment of the invention may be selected from a wide range of suitable choices, including for example, square, rectangular, triangular, oval, pie-slice, hexagonal, and others. Persons of ordinary skill in the art also will understand that functionally the cutting surface/element 22 does not need to be a cylinder (or even generally a cylinder). Those persons further will understand that, for whatever "final" configuration of cutting element/surface 22 is desired for a given application, at some point it may become as economic, or even more economic, to not "start"

with a drill bit cylinder 20 or other existing piece but instead specify and fabricate a custom shape/size/coating thickness/orientation/etc. for the cutting surface/element 22/20 to be used in practicing the invention. For example, and as illustrated in some of the drawings, if the cutting element 20 is configured and positioned so that only a part of the cylindrical surface 22 (such as the outermost half or less) will actually ever be used in the cutting process, it may be more economic to fabricate a custom shape rather than have so much of the PDC not ever actually be "used".

Figure 4:
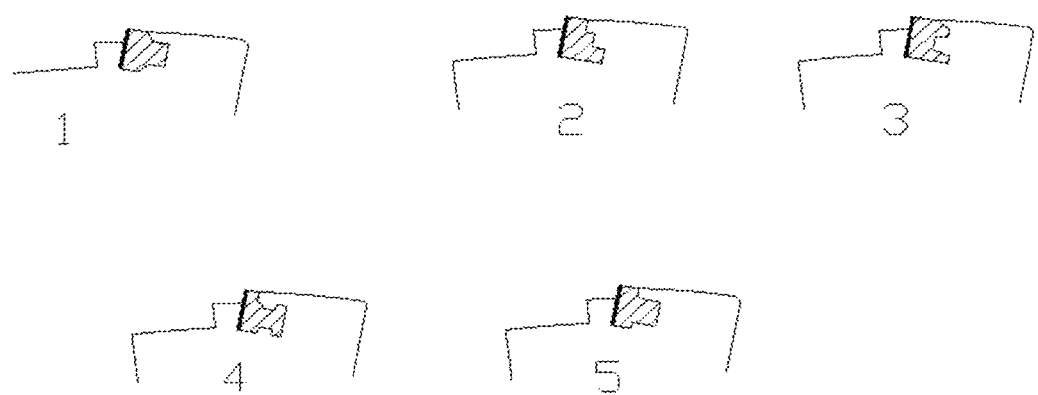
FIG. 4 shows a few examples of alternative embodiments of the keyed pattern of the present invention.

Among the many embodiments of the invention that may include a keyed relationship between the blade core 10 and the cutting elements positioned thereon, the particular shape and size of the interlocking/keyed portions can be any of a wide range. Persons of ordinary skill in the art will understand that, although the drawings only show a few examples of such a keyed pattern, many others can be used to practice the invention. In addition to the more detailed discussed below of one exemplary keyed shape, other examples of the many possible keyed shapes are shown in FIG. 4. For embodiments that use "standard" cylinders 20, the substrate body 24 (see FIGS. 2 and 2A) of each of those cylinders can be machined or formed via any suitable method into the desired keyed shape (such as shape 54 in FIGS. 2 and 2A).

Among other things, the keyed shape can affect the stresses and loads imposed upon both the blade core 10 and the cutting elements 20 during their use. Accordingly, the particular key design selected for any particular application may include stress reducing features such as avoiding sharp corners and tight radiuses, specific angles and dimensions (to adjust the relative position and cutting action of the cutting elements 20), the relative amount of "open space" (if any) within the pattern (such open space can help keep the blade cooler and/or help remove "spoil" from the trench as the trench is being cut), and others.

Similarly, the PDC or other cutting element 20 may be shaped with corners or other non-round/smooth features, to provide potential operational benefits such as faster digging, longer blade life, etc. However, those corners may be more likely to break or chip (as compared to a design without those corners). Blade designs of the invention can strike various balances of factors such as these and others (such as safety, longevity, etc.). For example, the risk of chipping of "angled/cornered" shapes may be reduced by at least slightly rounding any "corners", while still retaining a desirable degree of possible "extra" cutting/trenching advantage.

Figure 5:
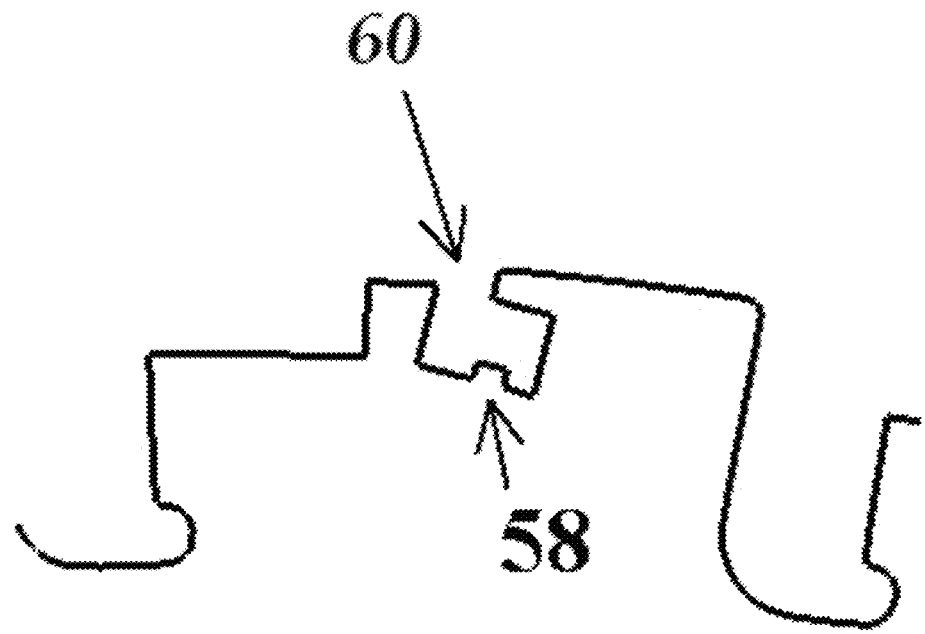
FIG. 5 is a side detail view of a preferred keyed shape of the present invention.
Figure 6:
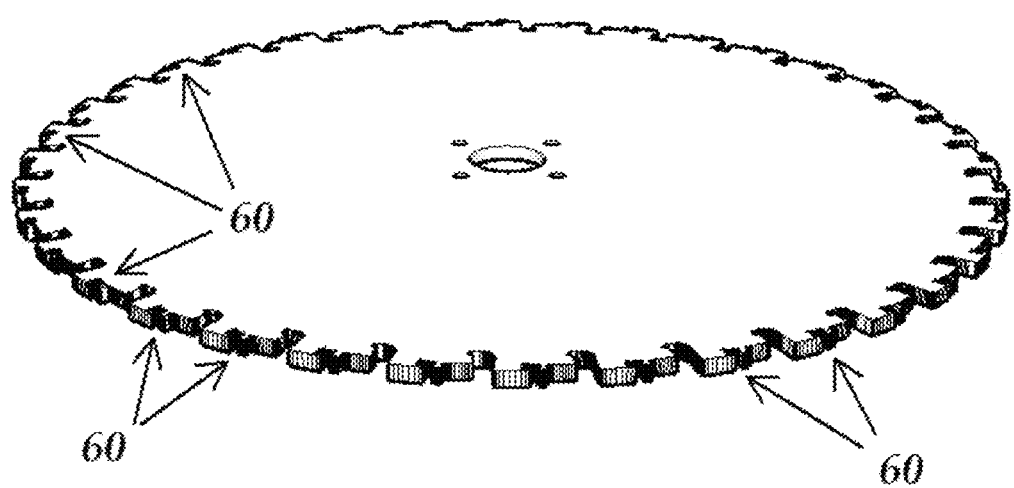
FIGS. 6, 6A, and 6B show three perspective views of the same "keyed/patterned" blade core from a slightly lower viewing angle (FIG. 6) to a slightly higher one (FIG. 6B).
Figure 6A:
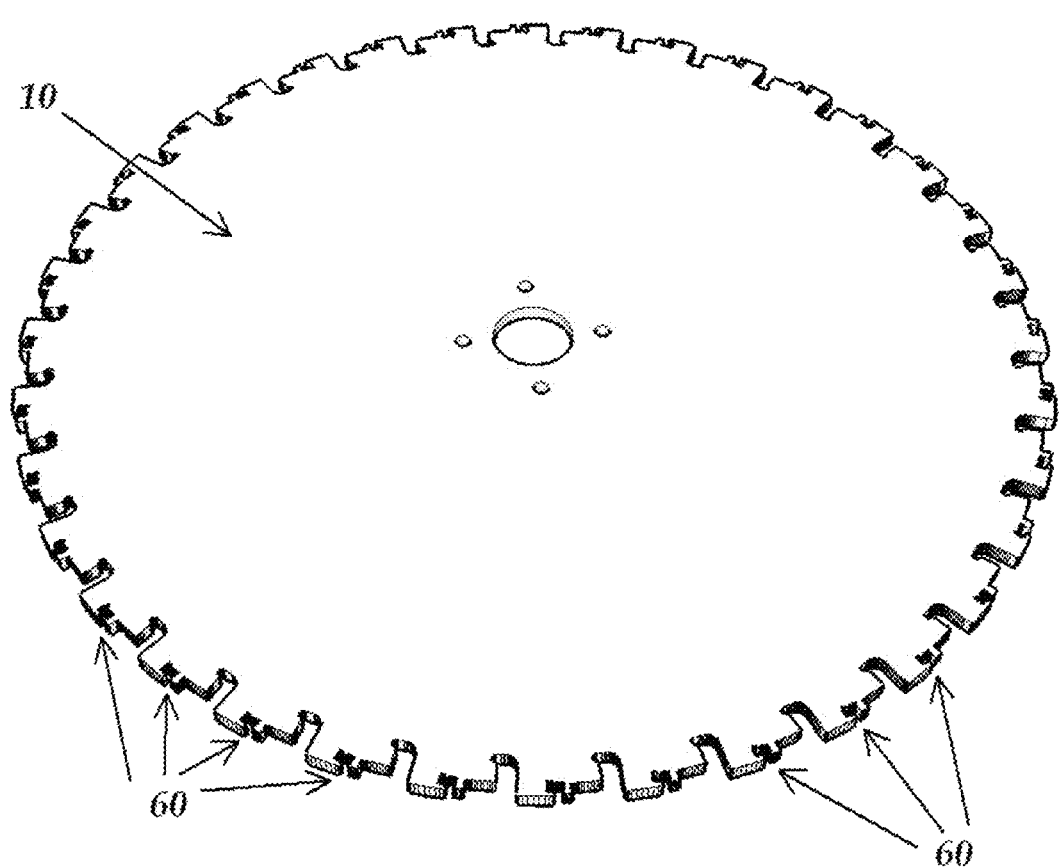
Figure 6B:
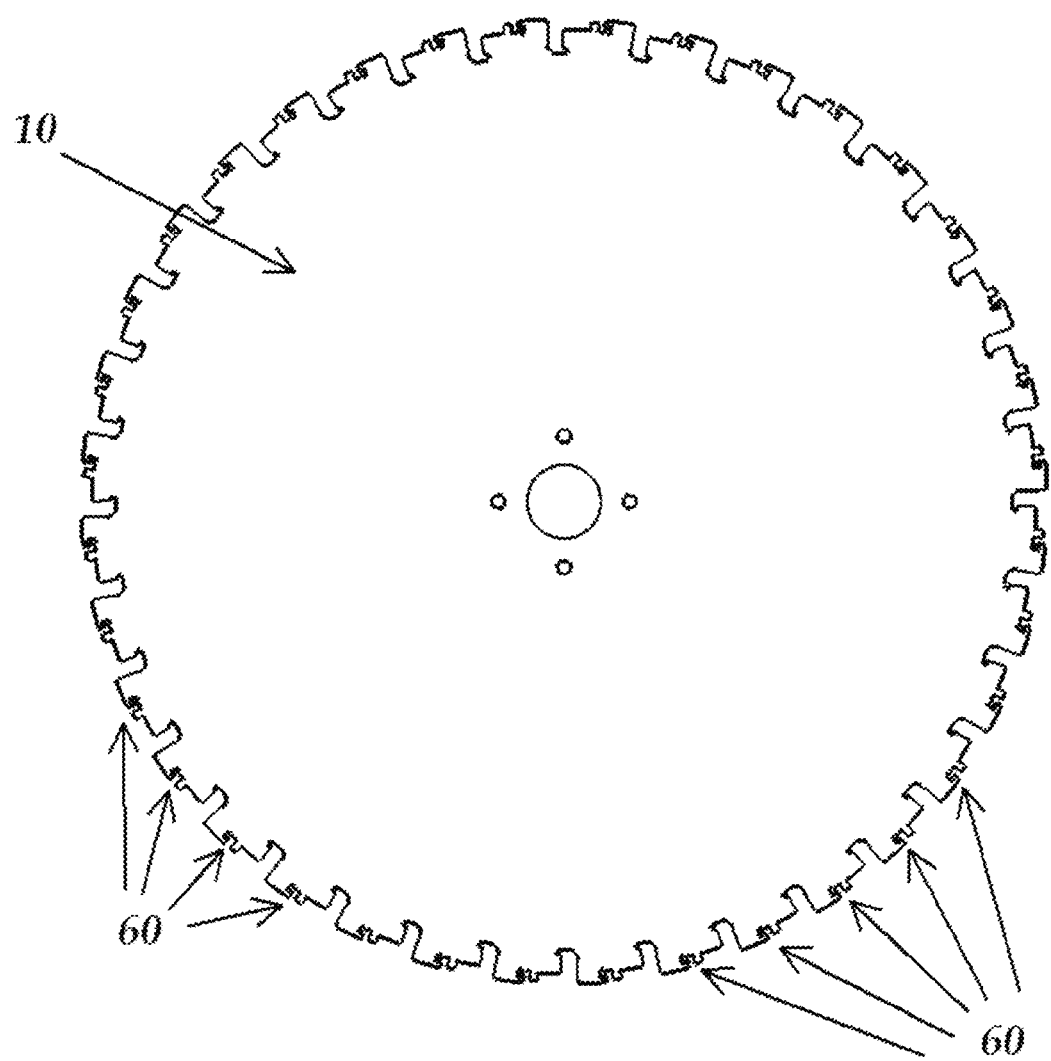
Figure 7:
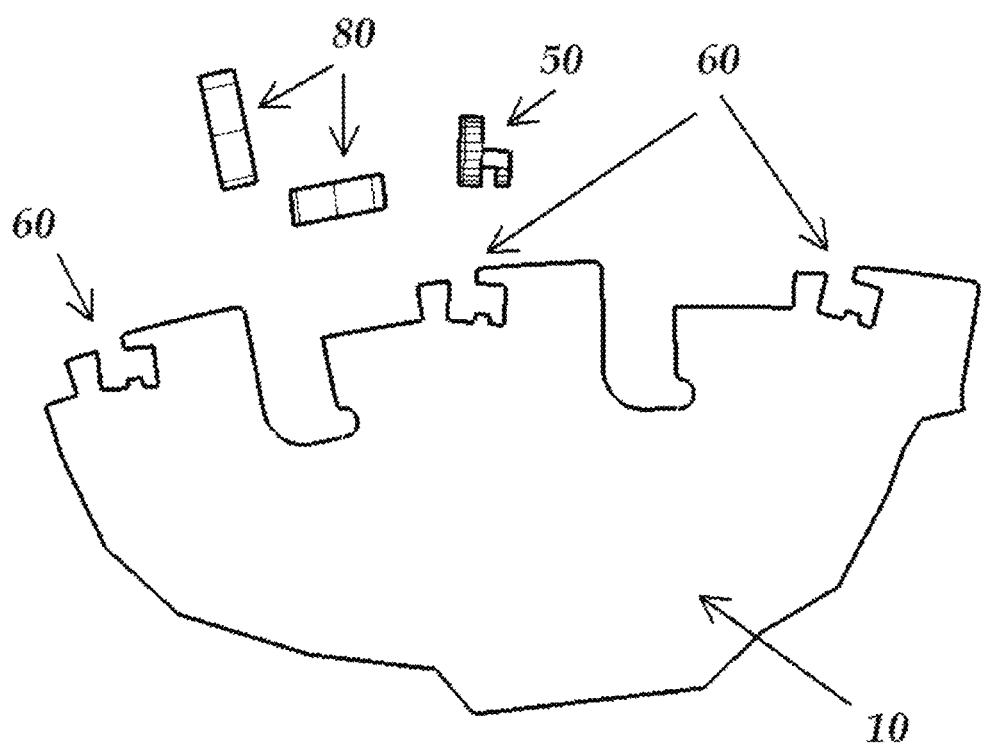
FIG. 7 shows a close-up view of part of the perimeter of the blade of FIG. 6, along with cutting elements and other "protective" components that may be used in certain embodiments.

FIGS. 5-7 illustrate another keyed shape in greater detail. The basic shape of FIG. 5 includes a keyed area 60, as well as other sections (to its right and left in the view of FIG. 5) that are discussed below. In embodiments such as shown in FIGS. 6 and 7, the shape from FIG. 5 is at least generally repeated around the perimeter of the core disc 10, as a generally uniformly-spaced pattern. FIGS. 6, 6A, and 6B show three perspective views of the same "keyed/patterned" blade core 10, from a slightly lower viewing angle (FIG. 6) to a slightly higher one (FIG. 6B).

The series of FIG. 7 drawings are various close-up views of part of the perimeter of the blade of FIG. 6, along with cutting elements 50 and other "protective" components 80 that may be used in certain embodiments. As further explained below, and as illustrated in the examples of the many alternative embodiments shown in FIG. 8, these additional protection elements 80 can be selectively positioned within and/or adjacent the keyed and/or repeating pattern around the blade's perimeter, to reduce the rate of wear and tear on the blade core 10 and/or the non-PDC portions of the cylinders/cutting elements 20/50.

Figure 7A:
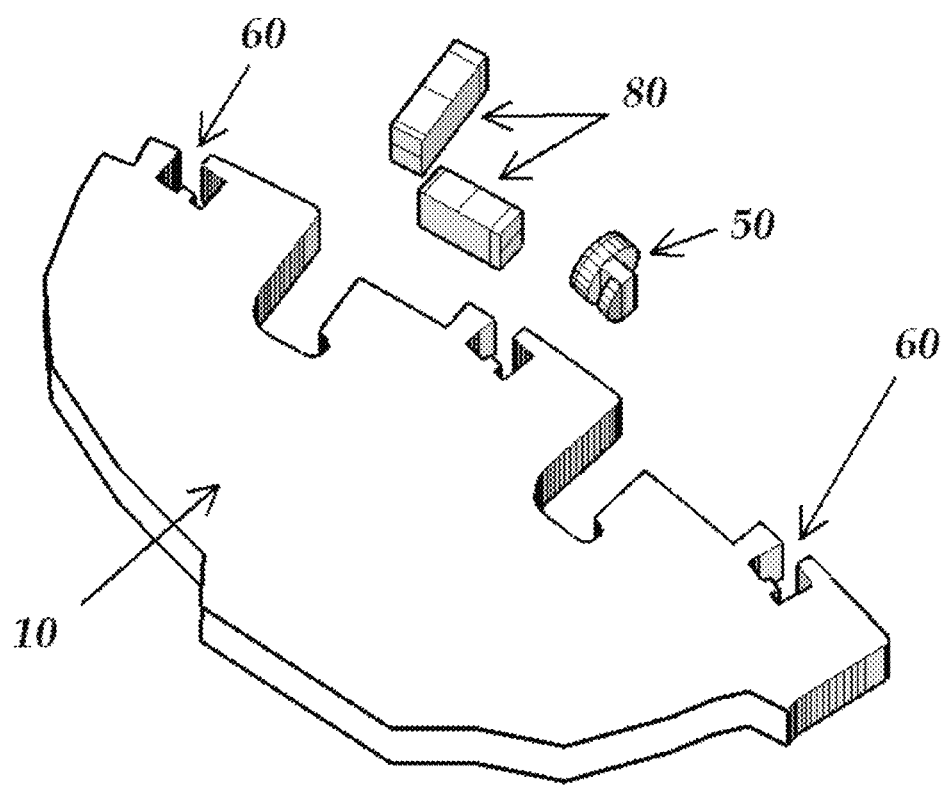
FIG. 7A is a perspective view of the embodiment shown in FIG. 7.
Figure 7B:
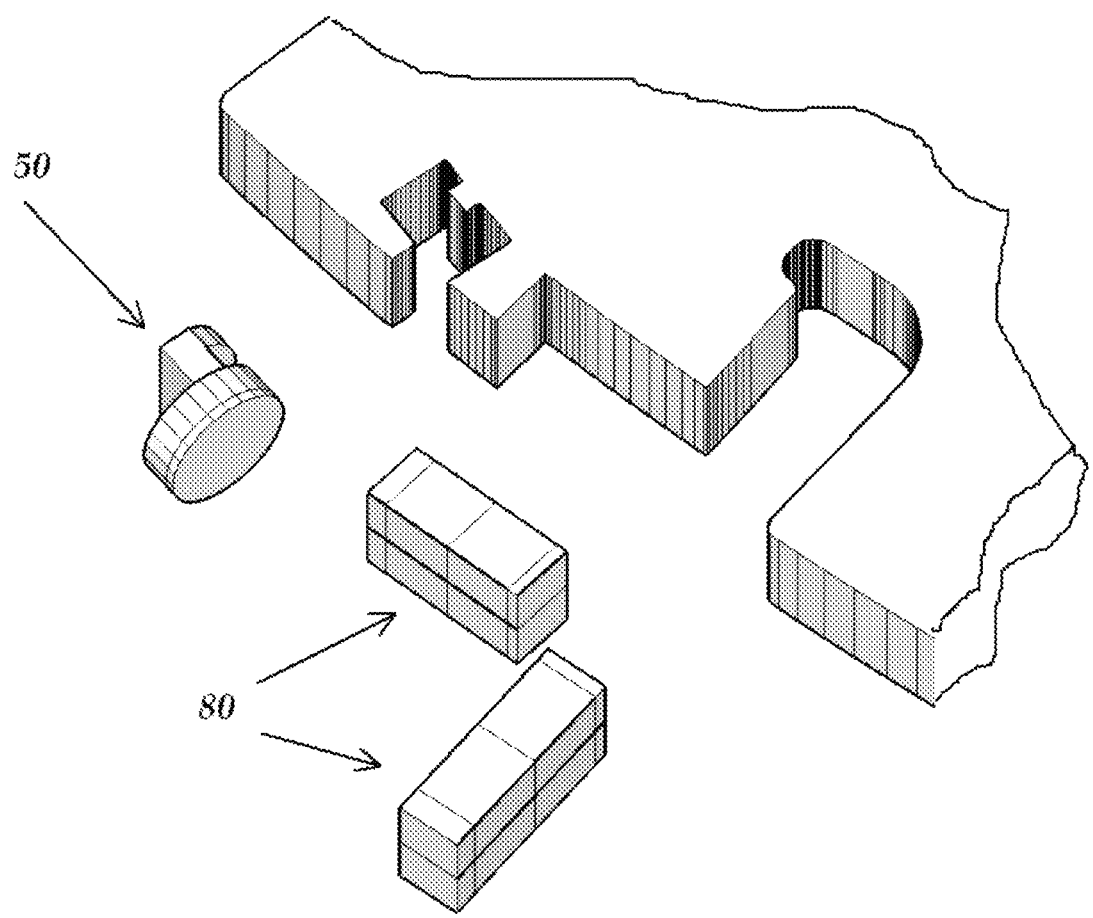
FIG. 7B is similar to FIG. 7A, but shows a reverse angle, and is focused on a single keyed "pattern" rather than the three shown in FIGS. 7 and 7A.
Figure 7C:
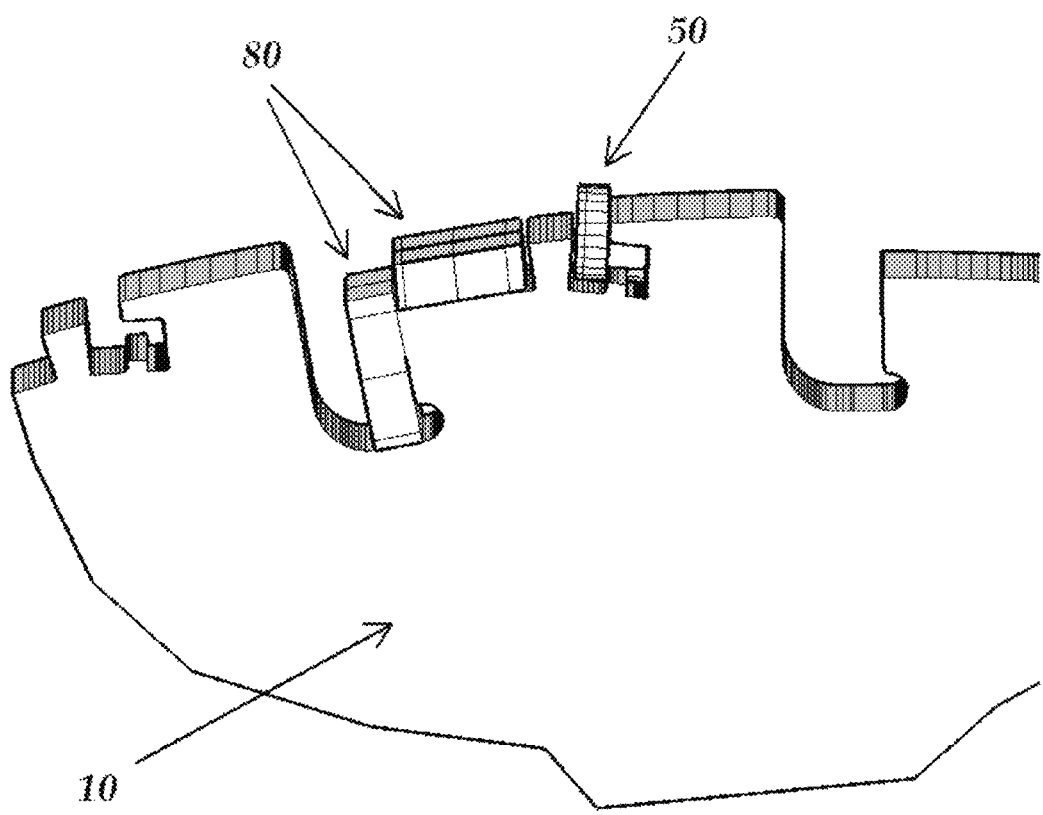
FIGS. 7C and 7D show those pieces of FIG. 7B positioned together into one assembly of the invention.
Figure 7D:
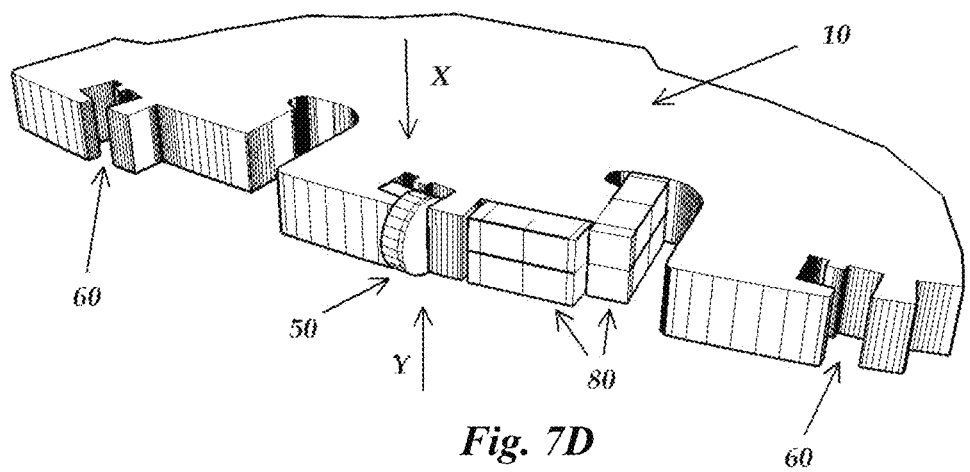
Figure 7E:
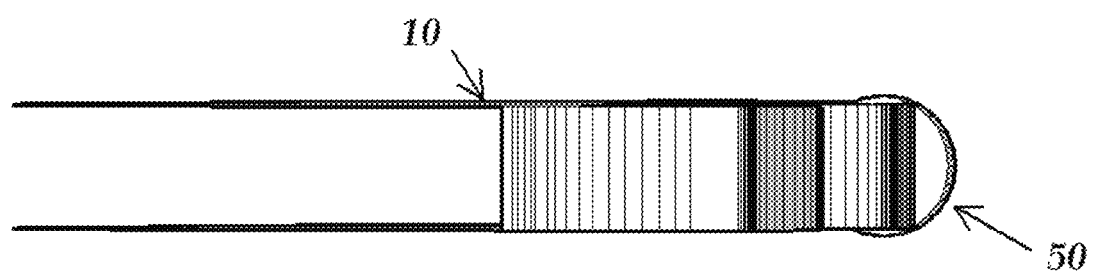
FIG. 7E is an end view taken along line 7E-7E of FIG. 7F.
Figure 7F:
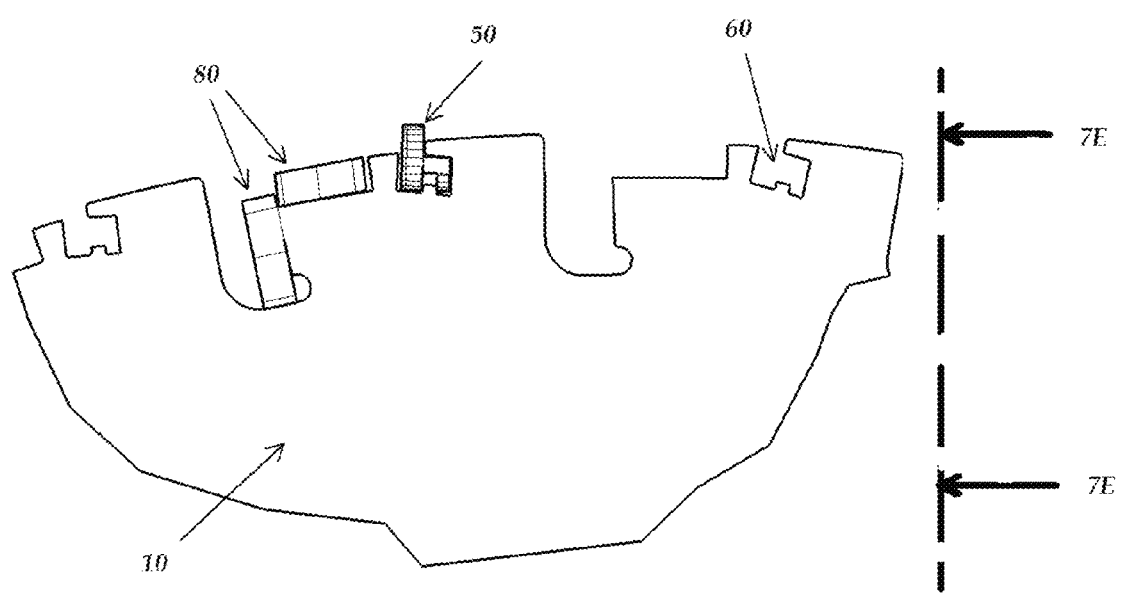
FIG. 7F is similar to FIG. 7C, but shows a plan view rather than perspective view.

FIG. 7 specifically illustrates an arc of the core 10's perimeter that includes approximately three of the repeated patterns of FIG. 5, with an exemplary cutting element 50 and other protection components 80. FIG. 7A is a perspective view of that same portion of the core 10 and the components 50 and 80. FIG. 7B is similar to FIG. 7A, but shows a reverse angle, and is focused on a single keyed "pattern" rather than the three shown in FIGS. 7 and 7A. FIGS. 7C and 7D show those pieces of FIG. 7B positioned together into one assembly of the invention (FIG. 7F is similar to FIG. 7C, but shows a plan view rather than perspective view, and FIG. 7E is an end view taken along line 7E-7E of FIG. 7F). The arrows X and Y indicate the directions from which the keyed cutting element 50 can be inserted into the corresponding keyed section of the core plate 10. Persons of ordinary skill in the art will understand that, as mentioned above, the assembly is held together by any suitable means, including brazing, silver-welding, or other method.

Figure 8:
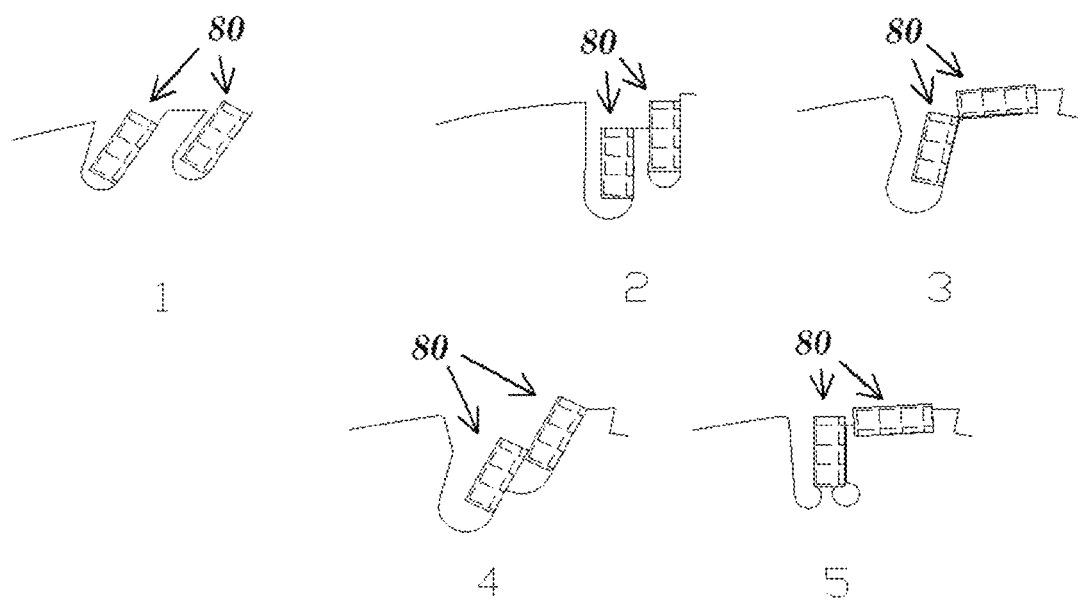
FIG. 8 shows some of the many alternative embodiments of shapes/patterns into which the core's edge may be cut or otherwise formed.

As indicated above, FIG. 8 shows some of the many alternative embodiments of shapes/patterns into which the core 10's edge may be cut or otherwise formed. Persons of ordinary skill in the art will understand that such patterns may include keyed portions or not, depending on the application, and that the particular key/pattern/shape selected for a given application/embodiment of the invention may include one or more protection elements 80. Preferably, the protection elements 80 are provided from a material that is relatively less expensive than the PDC cutting elements, and at least somewhat harder and/or more wear-resistant than the main body of blade core 10. Persons of ordinary skill in the art will understand that other embodiments may include PDC elements in place of (or to serve as) one or more of the protection elements 80, and that the particular selection of materials (PDC, compacted diamond grit, etc.) and/or the relative number and positions of those elements on the blade body 10 can be made to customize a particular embodiment of the invention for any particular expected or intended application/use. The element or elements 80 are shown in a generally block-shaped configuration, but a wide range of other shapes may be beneficially utilized.

Figure 7G:
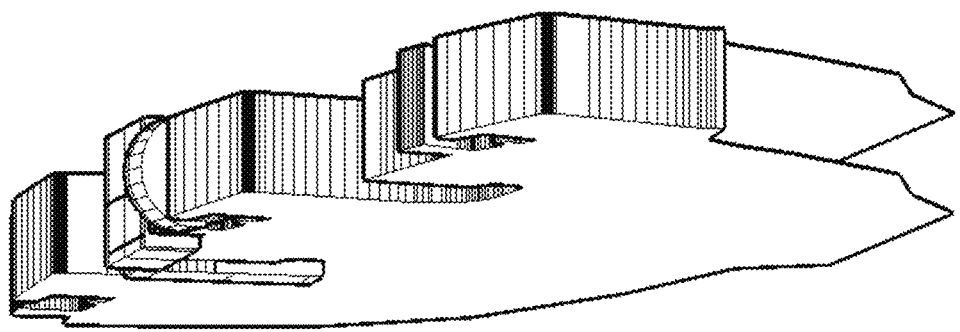
FIG. 7G is a bottom elevation view of the embodiment shown in FIGS. 7C and 7D.

Among other things, the protective elements 80 may be positioned and affixed strategically on the blade core 10, such as along and/or adjacent the various parts of the keyed shape/pattern. Persons of ordinary skill in the art will understand that strategic positioning of these elements 80 can reduce the wear that might otherwise occur on the blade core 10 (or parts thereof) during the trenching/cutting process. In some embodiments (for example, FIG. 7G), the piece or pieces 80 extend transversely on one or both sides of the blade core 10 (in the opposite directions of the X and Y arrows in FIG. 7D). Preferably, the pieces 80 extend at least the full width/thickness of the body of the blade core 10. Persons of ordinary skill in the art will understand that this desirable width can be accomplished with single pieces 80 or by selected positioning of a plurality of such pieces, or in any other suitable manner.

Persons of ordinary skill in the art will understand that the particular shape and size of any such element or elements 80 can be any of a wide variety and range. Among other things, embodiments having the aforementioned desirable relative width of protection elements 80 (wider than the blade body 10) can reduce the actual contact between the blade core 10 and the sides of the trench being cut, thereby reducing the wear that might otherwise occur (actually wearing away the blade core 10) and reducing the heat that would otherwise be caused by that friction (as mentioned above, the heat can soften the blade core 10, even to the point of failure). Thus, by proper sizing, positioning and other design choices for any given embodiment of the invention, these protection elements 80 can be on the "leading" edges of the blade's cutting teeth as the blade rotates during cutting/trenching, so that they take the brunt of the wear and tear that occurs during the cutting process. To at least some degree, the elements 80 thus can protect the somewhat softer blade body 10 (and/or the substrate portion of the cutting elements 20/50) that follow behind them during each rotation of the blade assembly.

Figure 9A:
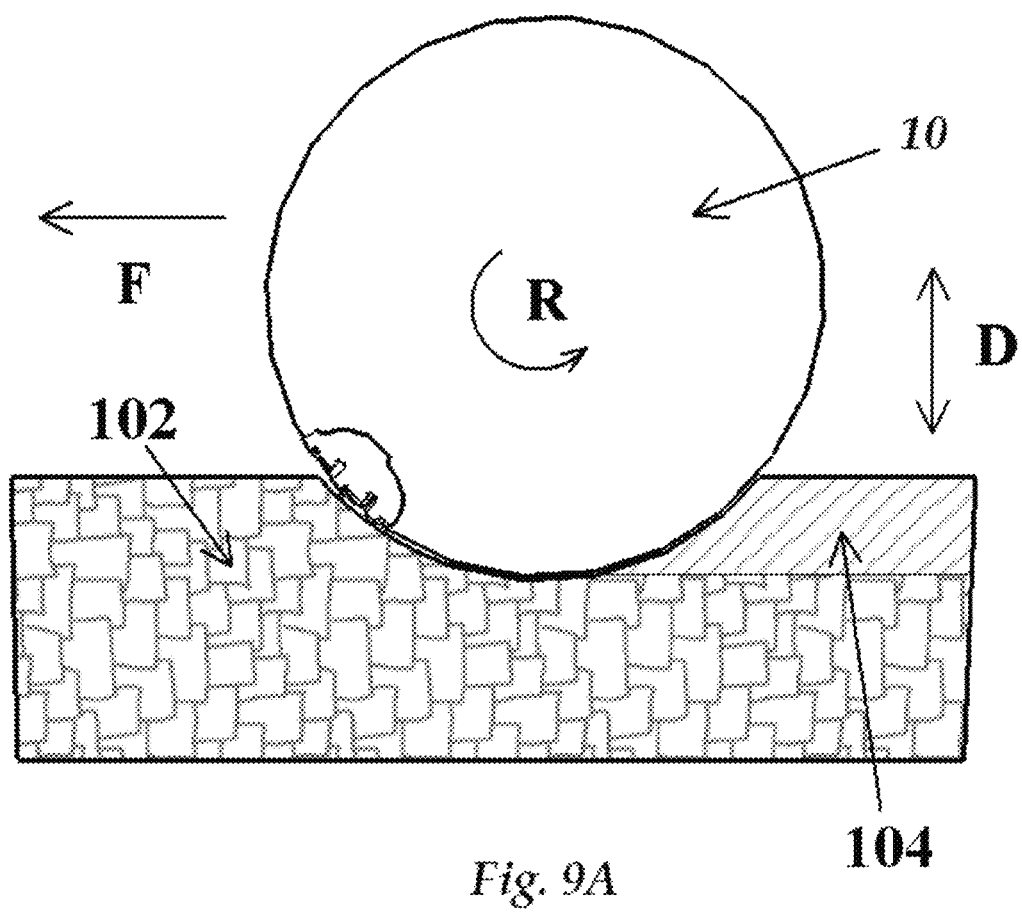
FIGS. 9A-9C show section/cut-away illustrations one of the embodiments of the invention as the blade assembly rotates through part of a cutting cycle.
Figure 9B:
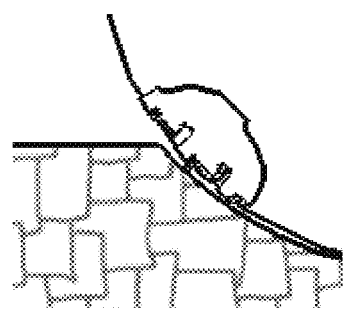
Figure 9C:
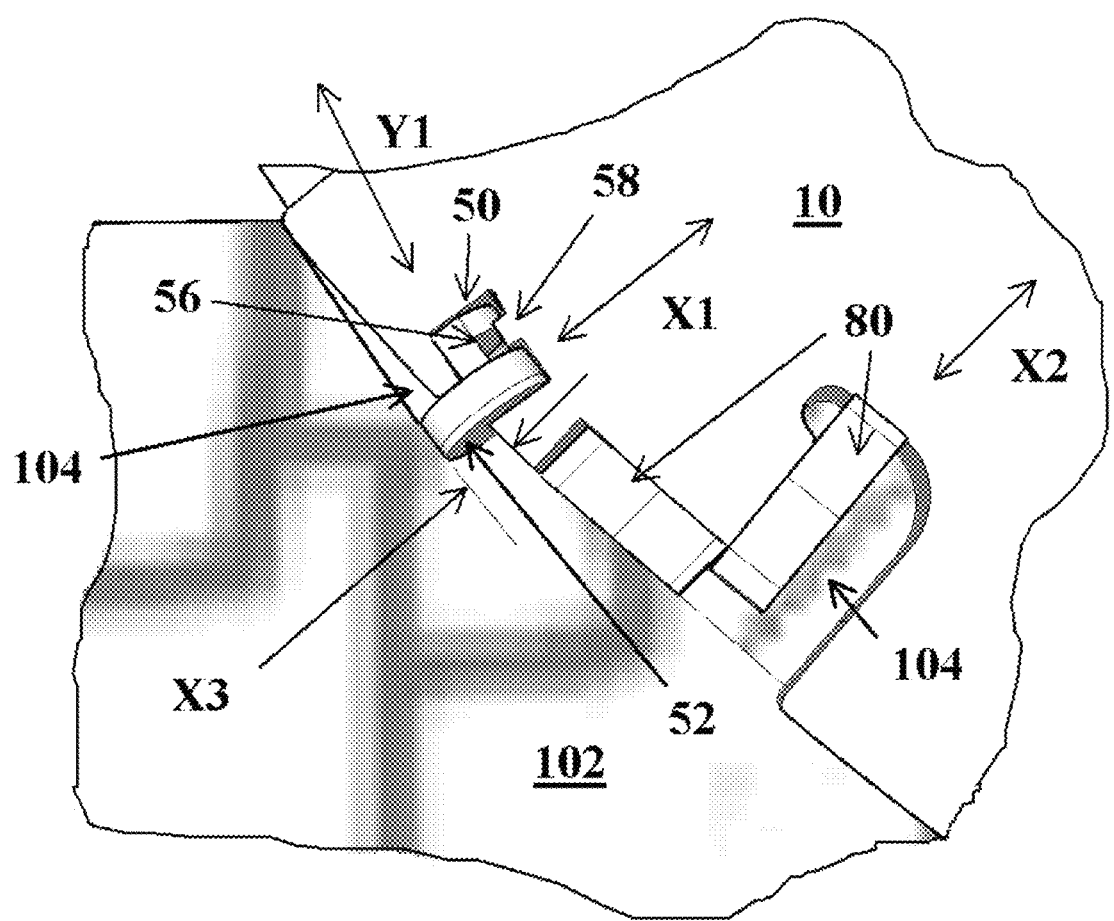

Certain of the above (and other) aspects of the inventions can be appreciated by reference to the "FIG. 9" drawing series. Beginning with FIG. 9A and continuing through FIG. 9C, these section/cut-away drawings illustrate one of the embodiments of the invention as the blade assembly rotates through part of a cutting cycle. The blade rotation is indicated by arrow R, adjustment of the depth of the trench is shown with arrow D, and the direction of cutting movement of the assembly is indicated by arrow F. Only a portion of the "keyed pattern" is shown in the drawings; persons of ordinary skill in the art will understand that the pattern may be continued around the perimeter of the blade core 10, or some other structure/pattern may be used there, depending on the embodiment of the invention.

In that "FIG. 9" drawing series, the undisturbed earth (or other material into which the trench is to be cut) is indicated by area 102, and the "finished" trench area is marked as area 104. The close-up views of FIGS. 9B and 9C (enlarging the keyed portion of FIG. 9A) illustrate visually how some of the design decisions may affect performance of any given embodiment. For example, the composition of material 102 (as well as it can be known in any given situation), and whether that material 102 includes random elements such as rebar or other steel pieces, are other factors in designing not only the blade assembly but also the rotation speed R and the transverse movement F and the depth D with which that embodiment is used. Persons of ordinary skill in the art will understand that, when cutting into an asphalt or concrete roadway, there almost always will be some degree of uncertainty about what exactly might be under the surface of the asphalt. Depending on a combination of those and other factors, the heat to which the blade 10 is exposed can be increased or decreased for a given set of parameters F/D/R/etc. Generally, cutting "more" material 102 in a shorter period of time will result in a greater amount of energy/heat imposed at the cutting interface, but persons of ordinary skill in the art will understand that sometimes the adjustments of those factors can be counterintuitive—for example, in some circumstances, slowing down the blade rotation R may actually increase the heat that is generated.

FIG. 9C further illustrates some of the effects that design may have on any particular embodiment of the invention. The position of the cutting element 50 can be adjusted in many ways, including for example along the X1 and Y1 axes. As mentioned above, angle of rotation of that element 50 with respect to the blade core 10, and the general shape of the cutting element PDC surface 52 can also affect the shape and amount of that surface 52 that actually is exposed to the earth/material 102. In the example of FIG. 9C, adjusting the design along the X1 axis will affect the "height" X3 of the PDC material that is exposed for a given embodiment of the invention. Likewise, and as mentioned above, protection elements 80 can be sized and positioned (for example, along axis X2 in FIG. 9C) in a wide range of configurations, all of which may affect the actual cutting/trenching performance of the assembly/process of the invention. Persons of ordinary skill in the art will understand that areas 104 in FIG. 9C are in fact indicated as being part of the larger trench 104 that has been cut in this drawing, but that during the actual cutting process, those and similar areas may in fact be filled with "spoil" that will be carried in that position as the blade rotates until the spoil either falls out of that space (in the trench area 104 to the right of the blade 10 in FIG. 9A, or completely out of the trench—above the ground level) or is vacuumed, blown, washed, or otherwise removed by a supplementary system (as part of the invention—not shown).

Certain of those design decisions can intentionally expose only a relatively small portion of the cutting surface 52 (maybe 1/16 of an inch or so in certain embodiments) that does the actual cutting of the material 102. As indicated above, the invention can be practiced with different amounts of that cutting surface 52 exposed, different shapes of cutting surface 52 fabricated and/or exposed, and even having only the exposed part of the "leading" surface 52 be formed from the PDC cutting material (rather than having a substantial part of the PDC "hidden" within the keyed area 60 of the pattern at the blade's edge). In certain embodiments, the amount of exposed cutting surface 52 is intentionally limited, to limit the amount of energy that has to be absorbed by the blade, and to limit the amount of debris that builds up and has to be removed during each revolution of the blade. Among other things, the design typically will balance cutting speed (which may be related to the amount of cutting surface exposed) against the stress imposed upon the core 10, and other factors.

In certain embodiments (again, not shown in the drawings, but as will be understood by persons of ordinary skill in the art), the invention can be used in a "wet-cutting" process; at least one of the contestants in the Google race used wet-cutting—they pumped liquid onto the blade and/or the cutting location during the cutting process. Using liquid in this manner can provide a number of benefits, but also has related costs (as mentioned above; drawbacks include the increased environmental "damage" when the used liquid/slurry runs out of the micro-trench, and the need to provide the liquid at the micro-trenching location in the first place). Among the benefits, the liquid can improve the cutting action of the entire process, and can help carry away the "spoil" or debris that is generated by the cutting process.

Wet-cutting liquids also can help dissipate the heat from the blade core and the cutting edge that may otherwise build up and have substantial and even dangerous consequences. Running any blade at extreme speeds for extended periods of time can soften, warp, crack, prematurely wear, or otherwise damage the blade core and other parts of the tool. For blades that have diamond or other pieces attached to their perimeters, such extreme temperatures can cause the bonding between those pieces and the core to weaken or break. Blade speeds in such applications can be 1400 RPM or even higher, and thus any part of the blade/cutting element that might break loose can be thrown at a very high speed, endangering any persons or things that might be in the vicinity. Even at lower rates of cutting (e.g., three to four feet per minute across a parking lot or street), and especially with dry-cutting, the cutting edge areas of a blade can get up to 600° C. or higher. In certain prior art technology, the operators therefore periodically stop cutting just to allow their blades to cool. Obviously, this wastes time and costs money, and the current inventions can provide improvements in that regard (and correspondingly reduce downtime and reduce costs).

Although "dry-cutting" by definition does not have the cooling and other benefits provided in "wet-cutting," it can be done with conventional diamond blades (as evidenced by the Google race, for example), but typically only at a very slow rate (e.g., approximately one foot per minute). In contrast, an embodiment of the present invention has been tested in the form of a three foot diameter blade core, and cut at three to four feet per minute for an extended period of time and distance. In fact, that embodiment of the present invention was tested to cut at a much faster rate than three to four feet per minute, but for that particular embodiment, so much heat was generated at that higher speed that it risked prematurely wearing out and/or damaging the core body of the blade.

For certain applications, it can be useful to include a vacuum system of some type, to be used in connection with the blade. Among other things, such a vacuum can remove and capture the cut materials and generally keep the blade cooler. With or without such a vacuum, the invention preferably allows a relatively continuous cut for a relatively greater distance than can be achieved with prior art blades.

For applications such as micro-trenching that require substantial speed and energy (and therefore typically generate substantial heat as they are cutting the trench), embodiments of the invention can have additional features (such as protection blocks/elements 80 above, or other features) to help improve performance and lifespan of the blade. For example, the heat can be so substantial that it can soften the core body 10 and thereby allow the friction (between the trench and the blade body 10) to wear away the "body" of the core blade (e.g., the sides of the core blade, at the radially outermost parts that actually are inserted into the trench itself and thereby exposed to friction, debris, and general wear and tear). As mentioned above, excessive heat can even soften the blade core to the point that it deforms or even fails.

Preferably, the invention is practiced in a modular manner, so that the various components (e.g., the blades; the motors and related mounts—for rotating, reciprocating, or otherwise powering the blade; the cutting elements; and any other apparatus used in practicing the invention) are effectively interchangeable with other such components. However, for embodiments and applications in which the motor/saw mounting fixture is a specific configuration, preferably the corresponding mounting structure 12 associated with the blade is configured to securely mate with that motor/saw mounting fixture.

These modular components may even be used in retrofitting or otherwise performing maintenance on existing devices. This enables easy customization, maintenance, and repair of an overall blade assembly 10. Also, depending on the application, certain components may be shaped differently than shown in the attached drawings, but their functionality preferably is at least substantially unaffected by such changes, and they may be interchangeable even with parts that are differently shaped (e.g., a cutting element 50 having a first configuration may be replaced by a cutting element 50 having a second/different configuration).

Although the blade member(s) 10 and other parts of the assembly preferably are modular, they can be fabricated in other combinations and sub-combinations, and can be relatively permanently assembled or otherwise utilized, all without departing from the spirit and scope of the invention.

Persons of ordinary skill in the art will understand that, among the many alternative embodiments of the invention, different combinations of conventional diamond grit segments and PDCs may be utilized, in different relationship to each other, in a variety of shapes, and in a variety of relative sizes and positions. One of those many examples would include a blade assembly in which only PDCs are used (rather than also using a non-PDC material for other features such as protection elements 80).

As indicated above, there are many different applications in which the invention can be used. Among others, it can be used to cut the small trenches for the servo loops that are placed into roadways near intersections, to function as sensors to change the traffic light signal at the intersection. In addition to the straight lines mentioned in connection with the Google contest described above, the invention can be used to cut curves and other patterns. Among other things, the limit on the tightness of the machine's turning radius (for any particular curve being cut) can be modified by adjusting various parameters in the embodiment of the invention (for example, the radius/diameter of the blade core 10).

For the purpose of summarizing the invention, certain objects and advantages have been described herein. Persons of ordinary skill in the art will understand that any particular embodiment of the invention may not necessarily achieve all such objects or advantages, and that the invention may be embodied or carried out in a manner that achieves or optimizes one advantage or group of advantages as taught herein without necessarily achieving other of the objects or advantages that may be taught or suggested herein.

The apparatus and methods of the invention have been described with some particularity, but the specific designs, constructions, and steps disclosed are not to be taken as delimiting of the invention. A wide range of modifications and alternative structures and steps for practicing the invention will make themselves apparent to those of ordinary skill in the art, all of which will not depart from the essence of the invention, and all such changes and modifications are intended to be encompassed within the appended claims.

The invention claimed is:

1. A cutting blade assembly including:
    a blade comprising a core element having a plurality of keyed mounting areas at its periphery, said keyed areas forming an interference fit with a plurality of polycrystalline diamond compact (PDC) cutting elements correspondingly keyed and thereby mounted to the blade and
    a plurality of diamond segments bonded to said core element adjacent said polycrystalline diamond compact (PDC) cutting elements.

2. The blade of claim 1, wherein said diamond segments are configured to protect the core element from undercutting and to prevent said PDC cutting elements from being inserted past a depth threshold into a material to be cut.

3. A method of fabricating a blade as described in claim 1, including the steps of:
    providing said blade;
    providing said plurality of cutting elements;
    providing a plurality of said diamond segments bonded to the core element; and
    operatively assembling at least one of said cutting elements with at least one of said correspondingly keyed mounting areas on said blade.

4. The method of claim 3, in which said step of operatively assembling includes sintering said cutting element into its desired position relative to said mounting area.

5. A method of micro-trenching, including:
    fabricating a blade assembly with a blade comprising a core element having a plurality of keyed mounting areas at its periphery, said keyed areas forming an interference fit with a plurality of polycrystalline diamond compact (PDC) cutting elements correspondingly keyed and thereby mounted to the blade and a plurality of polycrystalline diamond compact (PDC) cutting elements, and operatively mounting that blade assembly on a machine capable of rotating the blade assembly in a manner suitable for cutting a trench; and actuating the machine so that it rotates the blade assembly; and generally traversing the machine along the desired path of the trench, with the blade positioned to cut a microtrench of a desired depth.

\* \* \* \* \*

UNITED STATES PATENT AND TRADEMARK OFFICE
CERTIFICATE OF CORRECTION

PATENT NO. : 9,487,933 B2  
APPLICATION NO. : 14/386768  
DATED : November 8, 2016  
INVENTOR(S) : Dennis Wayne Clift Page 1 of 1

It is certified that error appears in the above-identified patent and that said Letters Patent is hereby corrected as shown below:

In the Claims

Column 13, Line 2, should read:
plurality of diamond segments bonded to said core element adjacent said polycrystalline diamond compact (PDC)

Signed and Sealed this
Eleventh Day of June, 2019

Andrei Iancu
*Director of the United States Patent and Trademark Office*